No. 744,081. PATENTED NOV. 17, 1903.
E. G. LEWIS.
DEVICE FOR REMOVING CASTERS.
APPLICATION FILED MAY 2, 1903.
NO MODEL.
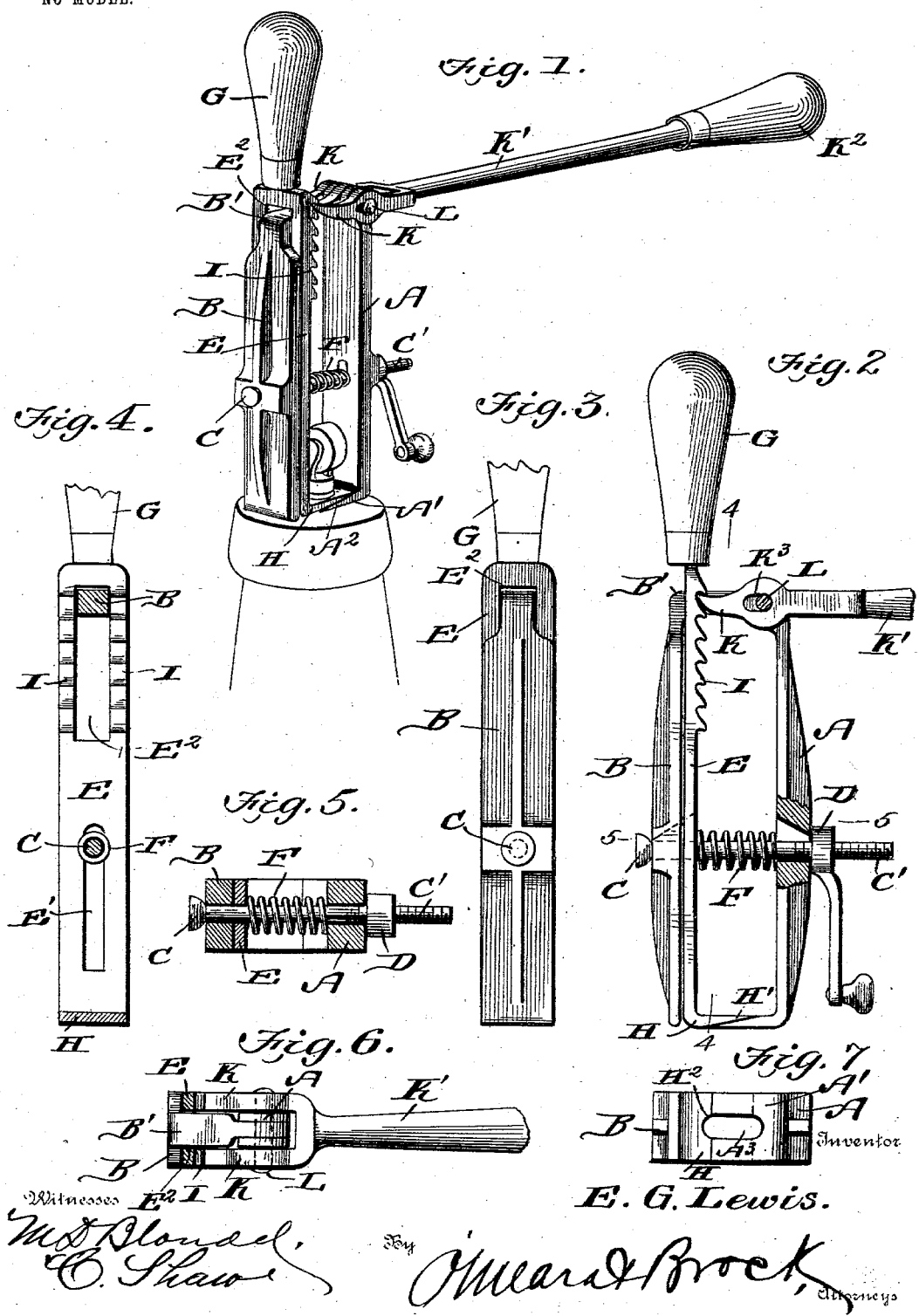
E. G. Lewis.

No. 744,081. Patented November 17, 1903.

UNITED STATES PATENT OFFICE.

EGBERT G. LEWIS, OF BUFFALO, NEW YORK.

DEVICE FOR REMOVING CASTERS.

SPECIFICATION forming part of Letters Patent No. 744,081, dated November 17, 1903.

Application filed May 2, 1903. Serial No. 155,343. (No model.)

*To all whom it may concern:*

Be it known that I, EGBERT G. LEWIS, a citizen of the United States, residing at Buffalo, in the county of Erie and State of New York, have invented a new and useful Device for Removing Casters, of which the following is a specification.

This invention is an improved device for removing casters from the legs of tables, chairs, and the like, the object being to provide a simple and efficient device by means of which said casters can be quickly and easily removed without splitting the end of the leg or bending or breaking the shank of the casters; and with these objects in view the invention consists, primarily, in the employment of a lifting-lever pivoted to a fulcrum-bar and operating upon the lifting-bar having a bifurcated foot-piece, said lifting-bar being held in place by means of a bearing-plate which is connected with the fulcrum-bar, said fulcrum-bar also having bifurcated foot-pieces which serve to steady the shank of the caster while being extracted.

The invention consists also in certain details of construction hereinafter fully described, and pointed out in the claims.

In the drawings forming part of this specification, Figure 1 is a perspective view showing the practical application of my invention. Fig. 2 is a side elevation of the device. Fig. 3 is an end view. Fig. 4 is a horizontal section on the line 4 4 of Fig. 2. Fig. 5 is a section on the line 5 5 of Fig. 2. Fig. 6 is a top plan view partly in section. Fig. 7 is an inverted plan view showing the lower ends of the fulcrum-bar, lifting-bar, and bearing-plate.

In carrying out my invention I employ a fulcrum-bar A, having a foot-piece A', which tapers, as shown at $A^2$, said tapered portion being bifurcated, as shown at $A^3$.

B indicates a bearing-plate which is of substantially the same length as the fulcrum-bar and which has a reduced angular portion B' at its upper end, which is pivotally connected to the upper end of the fulcrum-bar. A bolt C passes through the bearing-plate and through the fulcrum-bar, the threaded end C' having a lever-nut D arranged thereon and by means of which the bearing-plate and fulcrum-bar can be drawn toward each other when desired. A lifting-bar E is arranged upon the inner side of the bearing-plate B and is slotted vertically, as shown at E', the bolt C passing through said slot, and surrounding the bolt between the fulcrum-bar A and lifting-bar E is the coil-spring F, said spring serving to hold the lifting-bar, and consequently the bearing-plate, away from the fulcrum-bar. The upper portion of the lifting-bar is also slotted, as shown at $E^2$, the reduced angular portion of the bearing-plate passing through said slot, and upon the extreme end of the lifting-bar is arranged a handle G. The lower end of the lifting-bar is formed with an inwardly-extending foot-piece H, which is beveled, as shown at H', and adapted to overlap the beveled foot-piece A', and this beveled or tapered foot-piece H is bifurcated, as shown at $H^2$. The inner face of the upper portion of the lifting-bar is formed with a series of ratchet-faced projections I upon opposite sides of the slot $E^2$, said projections being arranged for the engagement of the prongs K of a bifurcated lever K', having an operating-handle $K^2$, said lever being pivoted to the upper end of the fulcrum-bar by means of the bolt L, which also serves to pivotally connect the upper end of the bearing-plate to the fulcrum-bar, and it will be noted that the members of the lever are slotted, as shown at $K^3$, so that the said lever can have a sufficient movement back and forth to bring the prong into and out of engagement with the projections I.

In operation the lever-nut is turned back, so that the spring F will separate the fulcrum and lifting bars, and the tapered bifurcated foot-pieces are inserted between the bearing of the caster and the end of the tapered leg, as shown in Fig. 1. The nut is then tightened, forcing the foot-pieces into engagement with the caster, and then by pulling the lever the lifting-bar will be lifted against the bearing-plate and carry with it the caster, and inasmuch as the bifurcated end of the fulcrum-bar also bears against the shank of the caster the said shank will be held straight during the pulling operation, it being understood, of course, that the handle G is held in one hand while the handle $K^2$ is held in the other.

By means of a device constructed as herein shown and described any and all casters can be quickly and easily removed from the end of a chair or table leg.

Having thus fully described my invention, what I claim as new, and desire to secure by Letters Patent, is—

1. A device for removing casters comprising a fulcrum-bar having a bifurcated, tapering foot-piece, a lifting-bar having a similar foot-piece overlapping that of the fulcrum-bar, and a lever pivoted to the fulcrum-bar, engaging the lifting-bar and drawing the foot of the lifting-bar away from the foot of the fulcrum-bar.

2. A device of the kind described comprising a fulcrum-bar having a bifurcated foot-piece adapted to engage a caster-stem on one side, a lifting-bar having a bifurcated foot-piece adapted to engage the opposite side of the stem and overlap the foot-piece of the fulcrum-bar, means carried by the bars for drawing the two foot-pieces together, and a lever pivoted to the fulcrum-bar and adapted to engage the lifting-bar and raise the foot-piece of the lifting-bar vertically above the foot-piece of the fulcrum-bar.

3. A device for removing casters, comprising the lifting-bar having a bifurcated lower end, the upper end having a handle connected thereto, the upper portion of said lifting-bar having a series of projections produced thereon, the fulcrum-bar also having a bifurcated foot-piece, the lever pivotally connected to the fulcrum-bar, said lever being adapted to engage the projections upon the lifting-bar, the bearing-plate, and means for connecting the fulcrum-bar and bearing-plate, substantially as described.

4. A device for removing casters comprising a lifting-bar having a handle at the upper end, the lower end having a beveled and bifurcated foot-piece, the intermediate portions of the lifting-bar being slotted vertically, and provided with ratchet-faced projections, a fulcrum-bar having a beveled bifurcated foot-piece, a bifurcated lever pivoted to the upper end of the fulcrum-bar and adapted to engage the projections upon the lifting-bar, the bearing-plate having the reduced angular upper end pivotally connected to the upper end of the fulcrum-bar, the bolt passing through the bearing-plate, the lifting-bar and fulcrum-bar, the lever-nut arranged upon the threaded end of the bolt, and the spring surrounding the bolt between the fulcrum-bar and lifting-bar, substantially as described.

EGBERT G. LEWIS.

Witnesses:
JOHN SHARP,
JNO. C. SCHULTZ.